(12) United States Patent
Shojaei et al.

(10) Patent No.: US 10,570,330 B2
(45) Date of Patent: Feb. 25, 2020

(54) USE OF SHAPE MEMORY MATERIALS IN WELLBORE SERVICING FLUIDS

(71) Applicant: Halliburton Energy Services, Inc., Houston, TX (US)

(72) Inventors: Amir Shojaei, Wilmington, DE (US); Dale E. Jamison, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/061,633

(22) PCT Filed: Dec. 19, 2016

(86) PCT No.: PCT/US2016/067599
§ 371 (c)(1),
(2) Date: Jun. 12, 2018

(87) PCT Pub. No.: WO2018/118014
PCT Pub. Date: Jun. 28, 2018

(65) Prior Publication Data
US 2019/0375978 A1 Dec. 12, 2019

(51) Int. Cl.
*E21B 33/12* (2006.01)
*C09K 8/508* (2006.01)
*E21B 43/25* (2006.01)
*C09K 8/487* (2006.01)
*C09K 8/035* (2006.01)
*C09K 8/502* (2006.01)

(52) U.S. Cl.
CPC ............. *C09K 8/508* (2013.01); *C09K 8/035* (2013.01); *C09K 8/487* (2013.01); *C09K 8/502* (2013.01); *E21B 43/25* (2013.01); *C09K 2208/08* (2013.01)

(58) Field of Classification Search
CPC ...... E21B 33/1208; E21B 43/08; E21B 41/00; E21B 43/082; E21B 43/108; C09K 3/1021
See application file for complete search history.

(56) References Cited

U.S. PATENT DOCUMENTS

| 9,567,836 B2 | 2/2017 | Jamison et al. |
| 2011/0030954 A1 | 2/2011 | Allison et al. |
| 2011/0067873 A1 | 3/2011 | Barnard et al. |
| 2013/0126170 A1 | 5/2013 | Johnson et al. |

(Continued)

FOREIGN PATENT DOCUMENTS

| WO | 2010127240 | 11/2010 |
| WO | 2014116457 | 7/2014 |
| WO | 2015108532 | 7/2015 |

OTHER PUBLICATIONS

International Search Report and Written Opinion for Application No. PCT/US2016/067599 dated Sep. 15, 2017.

*Primary Examiner* — Zakiya W Bates
(74) *Attorney, Agent, or Firm* — Tenley Krueger; C. Tumey Law Group PLLC (57) ABSTRACT

Wellbore servicing fluids including a shape memory material and methods of use are provided. A method may include: providing a wellbore servicing fluid including: a base fluid; and a shape memory material; deforming the shape memory material to have a temporary shape; introducing the wellbore servicing fluid into a wellbore; and activating the shape memory material such that the shape memory material changes from the temporary shape to an initial shape.

17 Claims, 4 Drawing Sheets

(56) References Cited

U.S. PATENT DOCUMENTS

| | | | |
|---|---|---|---|
| 2014/0360613 A1* | 12/2014 | Abshire | F16L 11/12 |
| | | | 138/104 |
| 2015/0361760 A1* | 12/2015 | McClung, III | C04B 40/0209 |
| | | | 166/293 |
| 2016/0221308 A1 | 8/2016 | Feinstein | |
| 2016/0238504 A1 | 8/2016 | Jamison et al. | |
| 2016/0312098 A1 | 10/2016 | Savari et al. | |
| 2017/0362500 A9 | 12/2017 | Taleghani et al. | |
| 2018/0037803 A1* | 2/2018 | Dahi Taleghani | C09K 8/516 |

* cited by examiner

USE OF SHAPE MEMORY MATERIALS IN WELLBORE SERVICING FLUIDS

BACKGROUND

Wellbore servicing fluids can be used in a variety of subterranean operations, including, for example, stimulation treatments, conformance treatments, hydraulic fracturing treatments, acidizing treatments, remediation treatments, scale removal treatments, scale inhibition treatments, and the like. As used herein, the terms "treatment" and/or "treating" refer to any subterranean operation that uses a fluid in conjunction with achieving an intended function and/or an intended purpose. Use of these terms herein does not imply any particular action by the fluid or any particular component thereof. As used herein, the term "treatment fluid" refers to any fluid that can be used in a subterranean operation in conjunction with an intended function and/or an intended purpose.

Drilling and completion fluid properties including rheology, viscosity and gel strength, may be important factors in designing a successful drilling operation. In some drilling operations, fluid properties may have narrow operable margins. In deep drilling processes where high temperature and pressure may be present, the fluid properties may be adversely affected by wellbore conditions and designing a drilling fluid operable to the well may prove challenging.

BRIEF DESCRIPTION OF THE DRAWINGS

These drawings illustrate certain aspects of some of the embodiments of the present invention, and should not be used to limit or define the invention.

DETAILED DESCRIPTION

Provided herein are methods, compositions, and systems for wellbore servicing fluids that include shape memory materials. The wellbore servicing fluids including the shape memory materials may be described as a programmable smart fluid because the shape memory material may be deformed (or programmed) to affect certain fluid properties such as, without limitation, viscosity, lubricity, gel strength, transport ability, and others. As used herein, programmable smart fluid may be any fluid that includes a shape memory material. The present programmable smart fluids may be programmed at the surface and be configured to respond to an external stimulus such as heat, magnetic fields, radiation, and chemicals to affect a property of the fluid. In this way, the fluid may delay the desired property until a targeted depth is reached. The fluid properties may also be continuously adjusted along the length of a wellbore by manipulation of the programmable smart fluid as it traverses the wellbore. Without limitation, the wellbore servicing fluids may include various well treatment fluids, such as without limitation, fluids used for diversion, conformance, fluid loss control, drill cuttings transport and/or other well treatments where control of fluid flow in subterranean formations may be desired. The programmable smart fluid may include a base fluid and a shape memory material.

The programmable smart fluid may have many applications and benefits, only some of which may be alluded to herein. One application may be a drilling fluid that includes a shape memory material. The properties of the drilling fluid such as yield strength, viscosity, and rheology properties may be designed to change with respect to changing wellbore conditions. Each of the fluid properties may have an effect on the overall performance of the fluid. For example, a high viscosity fluid may have the ability to transport more entrained solids. In some examples the smart fluid may be responsive to changes in depth, pressure, or temperature or a combination of the factors. During well logging operations such as in MWD (measurement while drilling) or wireline, the properties of the wellbore may be measured in recorded. If a property of the wellbore, such as temperature, is known, the shape memory material may programmed to react when a certain temperature is reached. Some of the properties a mud engineer may be concerned with include lubricity of the mud and the ability to transport drill cuttings. The lubricity may be important to ensure the drilling head does not prematurely wear though frictional damage. Lubricity may also be important in ensuring the drilling head does not seize during a drilling operation. The drilling fluid may also transport drill cuttings though the annulus formed between the drill string and the wellbore to the surface. Drill cuttings may need to be removed in order to advance the drill string further into the formation. In some examples, the shape memory material may be programmed to exhibit a relatively lower viscosity at the surface and then when a pre-determined temperature in the well is reached, the shape memory material may exhibit a relatively higher viscosity. The relatively higher viscosity may enable the drilling fluid to transport more drill fluid cuttings, for example.

Drilling fluids may include an aqueous based fluid or an oil based fluid. The aqueous fluid may be from any source provided that it does not contain an excess of compounds that may undesirably affect other components in the drilling fluids. For example, a drilling fluid may include fresh water or salt water. Salt water generally may include one or more dissolved salts therein and may be saturated or unsaturated as desired for a particular application. Seawater or brines may be suitable for use in some examples. An oil based fluid may be from any source. In some examples, the oil based fluid may include alkanes, alkenes, alkynes, and aromatic compounds. Further, the aqueous or oil based fluid may be present in an amount sufficient to form a pumpable slurry. In certain examples, the fluid may be present in the drilling fluids in a point ranging from about 33% to about 100% by weight of the drilling fluids. In certain examples, the fluid may be present in the drilling fluids in a point ranging from about 35% to about 70% by weight of the drilling fluids.

The drilling fluids may additionally include drilling fluid additives, which may include viscosifiers, shale stabilizers, emulsifiers, wetting agents, weighting agents, etc. As discussed above, the drilling fluids may be substantially free of solids. Alternatively, in some examples, the drilling fluid may include solids. The solids may be any type of solids found in a wellbore or introduced into a wellbore fluid. Without limitation, examples of solids may include pieces of the formation, drill cuttings, and additives introduced to a drilling fluid, e.g., lost circulation materials, weighting agents, etc. Suitable examples of weighting agents include, for example, materials having a specific gravity of 2 or greater, such as barite. Examples of weighting agents that may be used include, but are not limited to, hematite, illmenite, hausmannite, barite, and combinations thereof.

Another potential application may be a lost circulation fluid including a shape memory material. Lost circulation is a condition that may occur when a drilling fluid or other wellbore service fluid flows into the formation or other geological structure. A lost circulation event may lead to the loss of drilling fluid or in cases of severe lost circulation, a blowout of the well. The lost circulation may be caused by a high permeability zone in the formation or in some cases, gaps and cracks in the formation. A shape memory material may be included in a lost circulation fluid to remedy the lost circulation event. In some examples, a shape memory material that is a relatively smaller shape at the surface may expand into a larger shape at a predetermined position in the wellbore. If the location of the lost circulation zone is known, the shape memory material may be programmed to activate near or inside the lost circulation zone. In some examples the lost circulation fluid may enter the lost circulation zone in an inactivated state wherein the smart fluid may include relatively smaller particles and subsequently activate inside the lost circulation zone to expand into a relatively larger particle. The expansion of the shape memory material inside the lost circulation zone may reduce the permeability of the lost circulation zone and may completely block the zone from taking in any more drilling fluid. In some examples, the shape memory material may provide an expansive force that may effectively prevent migration of the shape memory material particles within the lost circulation zone. The combination of reduction of permeability and relatively low mobility of the activated shape memory material in the lost circulation zone may provide a seal against further lost circulation.

Another potential application may be barrier pills including a shape memory material. The shape memory material may be included in a barrier pill fluid in order to enhance the properties of the barrier pill. There may be a need to temporarily isolate wellbore zones during wellbore operations such as, for example, during the drilling and completion. Temporary isolation may be achieved by a barrier pill which may include, without limitation, thermoset fluids, time set fluids, highly thixotropic fluids, dilatant fluids, and high viscosity fluids. The barrier pill fluid may be pumped into place and may form a static plug that temporarily isolates a wellbore zone with respect to mass transfer. When there is no longer a need for zone isolation; the barrier pill may be removed by drilling through, rotating and washing through, and/or by displacing with another fluid. The barrier pill fluid may be incorporated into the drilling or completion fluid or circulated out of the wellbore and isolated for discharge, disposal, or reuse. Once a traditional barrier pill is placed downhole, its rheological properties usually cannot be changed without removing and replacing the barrier pill with one of a different composition. This may require additional operating time and expenses due to the required barrier pill removal and replacement procedures. The inclusion of a shape memory material in a barrier pill may allow the rheological properties of the pill to be altered in-situ. As in the example of the smart lost circulation fluid, if the properties of the wellbore at a certain point are known, the shape memory material may be programmed to exhibit certain properties at determined point in the wellbore. Alternately, the shape memory material may be programmed to react to an external stimulus. For example, the shape memory material may be "switched on" and exhibit a higher apparent viscosity once the barrier pill is in a predetermined position. The viscosity may be substantially high so that the migration of fluids though the pill is eliminated. The high viscosity may substantially isolate various portions of the wellbore. Once the barrier pill is no longer needed, the pill may then be "switched off" by an external stimulus to reduce the apparent viscosity and re-enable flow.

Another potential application may be clean-up pills including a shape memory material. A shape memory material may be included in a clean-up pill in order to enhance the properties of the clean-up pill. Debris and residue generated from drilling, milling, perforating, fracturing, and other wellbore operations may be deposited and accumulate in risers, blow-out preventers, casings, liners, bottom hole assemblies, and other wellbore equipment. The materials may interfere with the installation of equipment or with additional completion steps in the well. For example, it may be critical that all drilling fluids are displaced before the well may be cemented and completed. A clean-up pill may aid in removal of the debris and other wellbore particulate embedded in the wellbore walls. The smart fluid may aid in removal of debris by activation by external stimuli and, for example, increasing viscosity.

Another potential application may be wellbore strengthening pills including a shape memory material. The shape memory material may be included in wellbore strengthening pills (WSP) in order to enhance the properties of the wellbore strengthening pill. A WSP including a shape memory material may be placed in fractures or other permeable regions in a wellbore. The shape memory material may allow initial permeability of the WSP to remain high during injection to the fractured surfaces. The shape memory material may be activated, and the WSP may expand and lock into the fractured surfaces. The smart martial may include a variable permeability wherein the permeability may be controlled by an external stimuli. The smart WSP may therefore provide a means to control the shutdown permeability and permeability though fractures and permeable wellbore zones. The smart WSP may also allow the dynamic control of Young's modulus based on design needs. The Young's modulus of a smart WSP may be controlled though shape recovery cycles as further described below. The control of Young's modulus may allow the optimization of the moduli distribution across the fracture surface. Another potential use of the shape memory material may be as an interstitial material to minimize particle size attrition. Particle attrition refers to the breakage, fines generation, and fragmenting resulting from compression, impact, and shear. The effect may be observed in friable materials as well as agglomerated solids. In a fracture operation, the proppant that is pumped into a formation may experience a compressive force that is greater than its crush strength. The material may fracture and cause the generation of fines. A smart WSP may provide a barrier to transporting the fines into the wellbore. The shape memory material may act as an efficient tool to control the particle size distribution attrition.

Shape memory materials may be included in the wellbore servicing fluids. As used herein, the term "shape memory material" refers to smart materials that have the ability to deform and subsequently return to the pre-deformed shape when induced by an external stimulus or stimuli. In contrast, swellable polymers such as, for example, superabsorbent polymers, may absorb liquids and swell without any predetermined configuration. Shape memory materials may be designed, manufactured and/or programmed to morph into a beneficial shapes or configurations with an external stimulus. For example, a small spherically shaped material might morph into an elongated fiber with unique features along its axis. These features may be configured to interact with features of adjacent memory materials. Mixtures of discrete memory materials may work together as one device to provide a serviceable advantage. The original shape (or pre-deformed shape) may be referred to as a permanent shape while the deformed shape may be referred to as a temporary state. Some shape memory materials may retain a plurality of permanent shapes that may be transitioned though by varying the external stimulus. In some examples, the stimuli may be temperature. The shape memory material may exhibit one shape at a relatively lower temperature and another shape at a relatively higher temperature. In one example, the shape memory material may be deformed at a relatively lower temperature wherein the material is "frozen" in a position where it may retain its shape. The temperature may be increased and the shape memory material may return to its pre-deformed permanent shape. By way of example, some shape memory material properties of interest may be, without limitation, rheology, viscosity, gel strength, viscoelasticity, modulus, hardness, lubricity, charge, magnetic susceptibility, tackiness, compressive strength, tensile strength and solubility.

By way of example, other stimuli that may activate the shape memory material may include an electric or magnetic fields, light such as UV and Infrared, pressure, rate changes of pressure and solution properties such as pH, salinity and ion concentration. Ion concentration may be the concentration of any ion in solution, such as, for example, the ions from a dissolved salt. The materials disclosed herein may swell minimally, and in some embodiments, not at all, upon contact with a liquid, solid or gas and may be selectively controlled with combinations of stimuli. For example, temperature may be a stimulus, but only if another stimuli is present. Thus, any combinations of stimuli may be programmed to activate the desirable transition of shape memory materials Shape memory materials may include a shape memory alloy or shape memory polymer. Shape memory alloys may include many alloys such as, but not limited to, Ag—Cd, Au—Cd, Au—Al—Ni, Cu—Sn, Cu—Zn, Cu—Zn—Si, Cu—Zn—AL, Cu—Zn—Sn, Fe—Pt, Mn—Cu, Fe—Mn—Si, Co—Ni—Al, Co—Ni—Ga, Ni—Fe—Ga, Ni—Nb, Ni—Ti, Ni—Ti—Hf, Ni—Ti, Pd, and Ni—Mn—Ga. In general, the shape memory alloy may undergo a crystal structure change upon influence by the external stimuli. In particular, a Ni—Ti alloy may undergo a crystal structure change from more austenitic to more marstenistic upon cooling. The change in crystalline microstructure may affect macroscopic phenomena such as density, magnetism, permeability, etc. The other mentioned alloys may exhibit similar microcrystalline changes. In general, the shape memory alloy may be repeatedly deformed and returned to the permanent shape without significant loss of function.

A shape memory polymer may include polymers such as thermosets, thermoplastics, or foams. In particular, a shape memory polymer may include, but not limited to, polyurethanes, polyethylene terephthalate, polyethyleneoxide, polystyrene, polynoroborene, polyhedral oligosilsesquioxane. Combinations of suitable shape memory polymers may be used. In general, the shape memory polymer may be repeatedly deformed and returned to the permanent shape without significant loss of function. In some examples, a shape memory polymer and shape memory alloy may be combined in the same fluid. Materials that are not commonly regarded as shape memory materials may be combined with memory materials or other non-memory materials to make composite materials that behave as shape memory materials in the aggregate.

In the smart fluids, the shape memory material may be deformed with a temporary shape at the surface that may be activated when in the proper place in the wellbore. In some examples, deforming may include reducing the volume of a shape memory material or deformation to a pre-determined morphology or shape by application of a compressive force. The compressive force may be applied at a predetermined temperature and for a predetermined amount of time. In another example, the deforming may include exposing the shape memory material to a tensile force at a predetermined temperature for a predetermined amount of time. The deforming may be done at a relatively higher temperature of about 100° F. to 200° F. (37.77 to 93.33° C.) or a relatively lower temperature of about 50° F. to 100° F. (10° C. to 37.77° C.). Deforming may in some examples increase the density of the shape memory material by reducing the volume while retaining the same mass.

Without limitation, the shape memory material may include functional groups such as hydroxyl, carboxyl, amine, and others known in the art on the inside of a globular like structure. A globular like structure is a structure which has the shape of a globe or globule and may include one or more long chain polymers folded to make the structure. Long chain polymers may be any polymer with a repeating base structure wherein the base structure may repeat from about 100 times to several million times. The structure may open upon exposure to an external stimulus, thereby exposing the functional groups. In one example, a shape memory material including a functional group may be "rolled up" or compacted in such a way that the functional group is not exposed to the surroundings. The compacted shape memory material may include a single molecule, or a few molecules, of the shape memory material. Upon exposure to an external stimulus, the shape memory material may unravel and join into a larger mass. The exposed functional groups may for example, be attracted to one another by an electromotive force, or be made to react.

Without limitation, the shape memory material may be incorporated into fibers. By way of example, fibers may include a shape memory material and a glass material. Additionally, other fibers such as graphite, polyesters, polyamides and polyolefins may be combined with the shape memory material. The shape memory material may be in a fiber form or morph into a fiber form. Any suitable technique may be used for incorporation of the shape memory material into the fibers, including rolling and extrusion, among others. The fibers may be included in any suitable wellbore servicing fluid, but may be particularly useful in cement compositions. The fibers may be programmed, for example, by rolling, folding, or otherwise deforming, such that the fibers are in a deformed or programmed state. Upon application of an external stimulus, the fibers may return to their original elongated state. This may be beneficial in well operations, as the fibers including the shape memory material may be pumped into a wellbore in a programmed, and therefore "inactive", state and then unfolded in situ. The unfolding may entangle or otherwise cause the fibers to interact to, for example, arrange into a globular structure. The structure may exhibit any of the shape memory material properties, such as density change, previously mentioned.

Without limitation, the shape memory material may have a particle size in a point ranging from about 1 nanometer to about 5 microns, 5 microns to about 5 cm or from about 5 microns to about 1 cm or from about 500 microns to about 1 cm. However, particle sizes outside these disclosed ranges may also be suitable for particular applications. As used herein, the term "particle size" refers to volume mean diameter. In certain embodiments, the particles may have a mean particle size in a point ranging from about 1 micron to about 200 microns. The mean particle size corresponds to d50 values as measured by particle size analyzers such as the manufactured by Malvern Instruments. Worcestershire. United Kingdom. Even further, the shape memory material may have any suitable shape, including, but not limited to, platelets, shavings, fibers, flakes, ribbons, rods, spheroids, toroids, pellets, tablets, and other suitable physical shapes. The shape memory material may have a well-defined physical shape and/or an irregular geometry. Generally, the shape memory material may be included in the wellbore servicing fluid in an amount suitable for a particular application, including without limitation in an amount ranging from about 0.1% to about 30%, or from about 0.1% to about 5%, or from about 5% to about 10%, or from about 10% to about 15%, or from about 15% to about 20%, or from about 20% to about 25%, or from about 25% to about 30% by weight of the wellbore servicing fluid. One of ordinary skill in the art, with the benefit of this disclosure, should be to select an appropriate type and amount of shape memory material to include in a wellbore servicing fluid for a particular application.

A shape memory material may be 3D printed in order to create custom shapes. Custom shapes may have many advantages such as, if the material properties of the printed product are well understood, the time dependent behavior may be predicted. The material properties may be predicted in 4 dimensional space, 3 physical dimension and one time dimension. With the knowledge of the time dependent material properties, a 4D printed shape memory material may be designed. For example, if the elastic modulus of a material is known, it may be possible to predict the time it would take for a particular shape to return to the permanent state given a certain temperature and stimuli. Another example may be a shape that has a low contact surface area such as a star shape. If a compressive force is applied to a 3D printed shape memory material and the volume of the shape memory material is reduced, it may be possible to predict the time dependent volume of the shape memory material.

Any of the previously mentioned wellbore servicing fluids may include a base fluid, which may be aqueous or non-aqueous. Suitable non-aqueous fluids may include one or more organic liquids, such as hydrocarbons (e.g., kerosene, xylene, toluene, or diesel), oils (e.g., mineral oils or synthetic oils), esters, and the like. Suitable base fluids may include, without limitation, freshwater, saltwater, brine, seawater, or any other suitable base fluids that do not undesirably interact with the other components used in a composition including a shape memory material. Without limitation, the base fluid may be an aqueous salt solution. Such aqueous salt solutions can have a salt concentration ranging between about 0.1% and about 10% by weight. Without limitation, the salt concentration may be between about 1% and about 10% by weight or between about 2% and about 5%. The salt of such aqueous salt solutions may include an alkali metal or alkaline earth metal salt. Illustrative alkali metal salts may include, for example, NaCl, NaBr, KCl, and KBr. Illustrative alkaline earth metal salts may include, for example, CaCl2, CaBr2, and ZnBr. Other alkali metal or alkaline earth metal salts such as, for example, nitrates, acetates, and soluble formates can also be used for forming the aqueous salt solution. In some examples, the base fluid may include an aqueous acid solution. Illustrative aqueous acid solutions may include one or more acids, such as hydrochloric acid, hydrofluoric acid, acetic acid, or formic acid, among others. Other organic acids may also be suitable. Aqueous acid solutions may be used in acidizing treatments, for example, to increase the permeability of producing zones. Generally, the base fluid may be included in the wellbore servicing fluid in an amount suitable for a particular application, including without limitation in an point ranging about 10% to about 99%, or from about 10% to about 30%, or from about 30% to about 50%, or from about 50% to about 70%, or from about 70% to about 90%, or from about 90% to about 99% by weight of the wellbore servicing fluid. One of ordinary skill in the art, with the benefit of this disclosure, should be to select an appropriate type and amount of base fluid to include in a wellbore servicing fluid for a particular application Depending on the wellbore service fluid the shape memory material will be added to, the wellbore service fluids optionally may include any number of additional additives, including, but not limited to, surfactants, fluid loss control additives, gas, nitrogen, carbon dioxide, tackifying agents, foamers, corrosion inhibitors, scale inhibitors, catalysts, clay control agents, biocides, friction reducers, anti-foam agents, bridging agents, dispersants, flocculants, $H_2S$ scavengers, $CO_2$ scavengers, oxygen scavengers, lubricants, viscosifiers, breakers, weighting agents, relative permeability modifiers, resins, particulate materials (e.g., proppant particulates such as sand or ceramic particles), wetting agents, coating enhancement agents, and the like. A person skilled in the art, with the benefit of this disclosure, should recognize the types of additives that may be included in the wellbore servicing fluid for a particular application.

In addition, the pH of the wellbore service fluid may also depend on the particular treatment. Wellbore service fluid fluids with a high pH (e.g., 10 to 14) may be used, and wellbore service fluid fluids with a low pH (e.g., <4) may also be used. Wellbore service fluid fluids with a low pH may be used, for example, in acidizing treatments with a base fluid that includes an aqueous acid solution.

Figure 1:
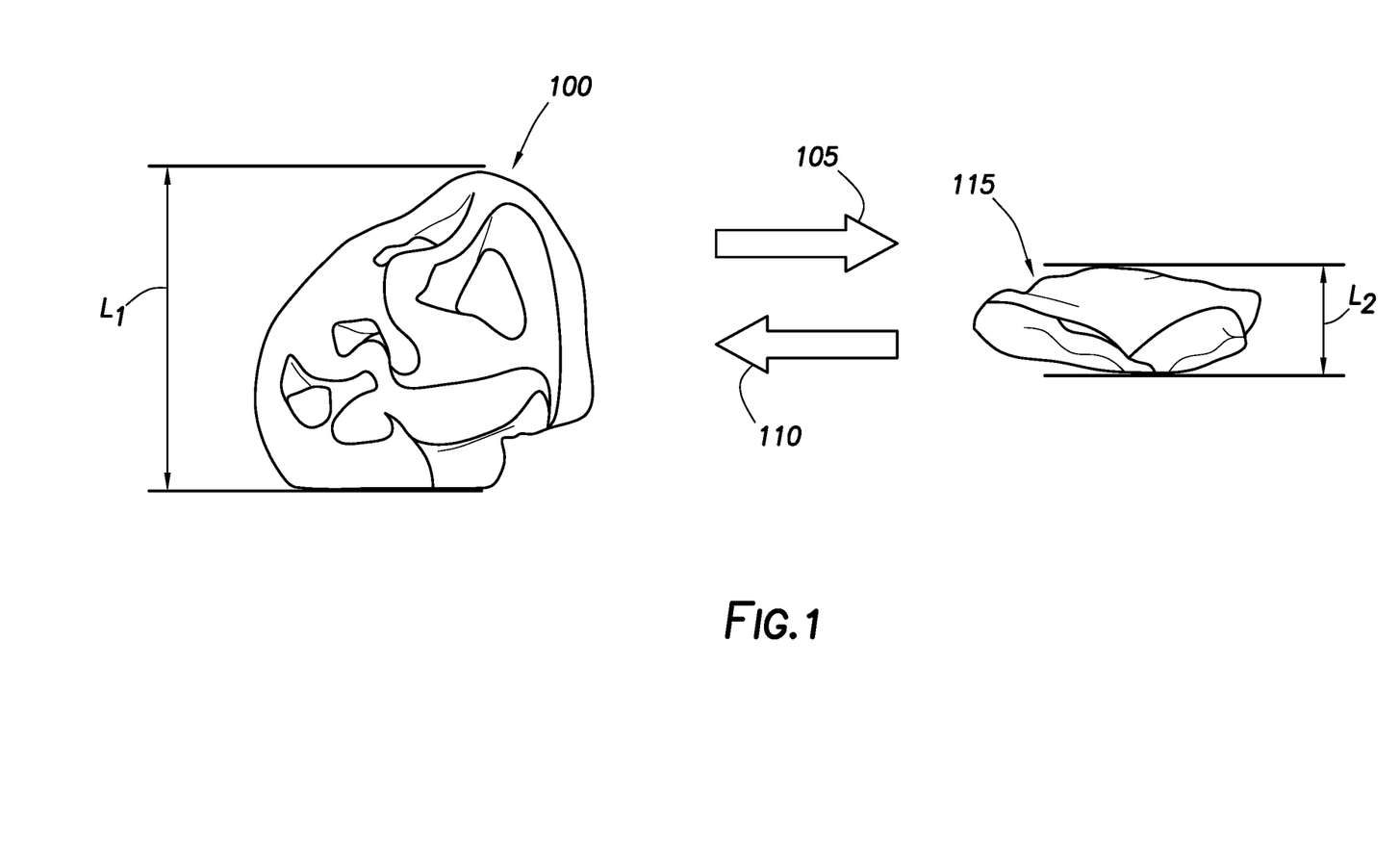
FIG. 1 is a schematic illustration of the deformation of a shape memory material.

Example methods of using the programmable smart fluids will now be described in more detail with reference to FIG. 1. Any of the previous examples of the programmable smart fluids may apply in the context of FIG. 1. FIG. 1 illustrates an example shape memory polymer 100. FIG. 1 schematically shows programming (block 105) and recovery (block 110) cycle for the shape memory polymer 100 including a random shape. The programming and recovery cycle may be repeated numerous times without significant loss of shape recovery. The step of programming (block 105) may include a compression or tension at a low or high pressure. As illustrated in FIG. 1, the shape memory polymer may deformed by compression to a smaller size. The step of programming (block 105) may occur at the surface such that the shape memory polymer in the compressed state may be pumped and introduced into the wellbore. The programmed shape memory polymer 120 may recover to the original size by exposure to heating, magnetic field, infrared, or any of the previously mentioned stimuli. The step of recovery (block 110) may occur in situ, for example, after the programmed shape memory polymer 115 has been placed into a subterranean formation. The programming (block 105) and recovery (block 110) cycles may be repeated numerous times without significant loss of shape recovery.

Without limitation, the shape memory polymer or shape memory alloy may include a coating that may delay the activation process until components reach the desired depth in the well. Without limitation, the coating may be water or oil dissolvable. The thickness of the coating may be designed with respect to the hydrostatic pressure needed to fracture the coating. The coating may also break or dissolve by other means discussed below. In some examples, the shape memory material may be programmed at the surface and then coated with a layer of material that may be dissolvable. Examples of suitable coatings may include oil or water soluble polymers, semipermeable coatings, thermally unstable polymers, clays, mechanical shear sensitive polymers, acid sensitive materials such as carbonates, base sensitive materials such as resins, and materials that may be oxidized. Once the shape memory polymer or shape memory alloy reach the desired depth the coating may fail due to hydrostatic pressure or dissolving in the fluid from the surface to the desired depth. The shape memory polymer or shape memory alloy may be exposed to external stimuli such as, for example, downhole temperature, and recover their original shape.

Figure 2:
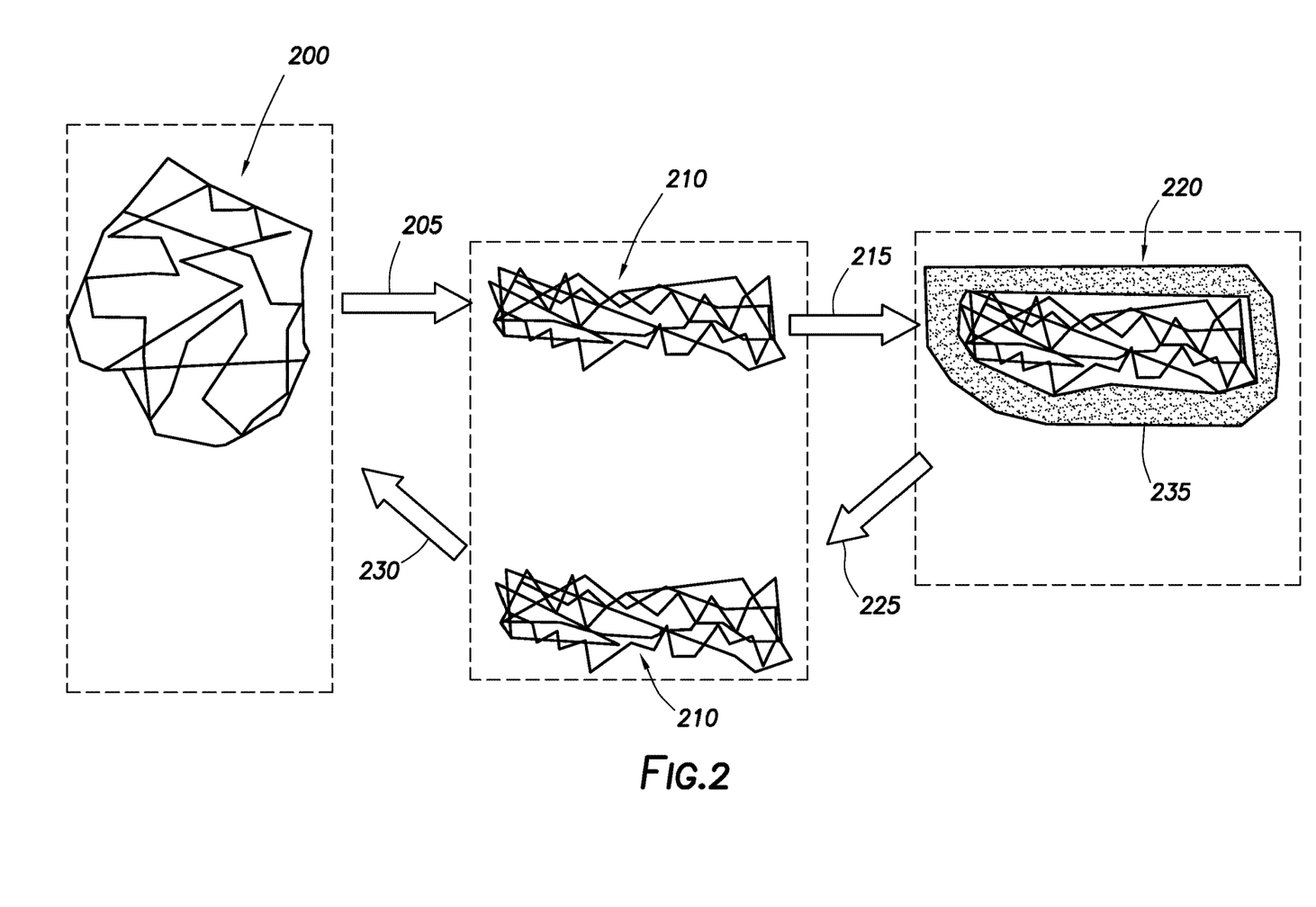
FIG. 2 is a schematic illustration of the deforming and coating of a shape memory material.

FIG. 2 illustrates the process of coating a shape memory material and subsequent shape recovery. A shape memory material such as shape memory alloy or shape memory polymer may include a permanent shape 200. The shape memory material may be programmed as depicted by arrow 205 to conform to a programmed shape 210. Programmed shaped 210 may be a random shape or it may be a predetermined shape. Programmed shape 210 may be coated with a coating 235, which may be water or oil dissolvable, as depicted by arrow 215. Coating 235 may substantially coat programmed shape 210. Coating 235 may be designed to break at a certain wellbore depth or after a certain time in the wellbore. Coated shape 220 may be introduced into the formation via a servicing fluid such as a drilling fluid. As depicted by arrow 225, coating 235 may be dissolved or otherwise removed once a certain depth has been reached or a predetermined amount of time has passed. The uncoated programmed shape 210 may recover the permanent shape 200 as depicted by arrow 230. As discussed previously, programmed shape 210 may recover permanent shape 200 by any external stimuli.

Figure 3:
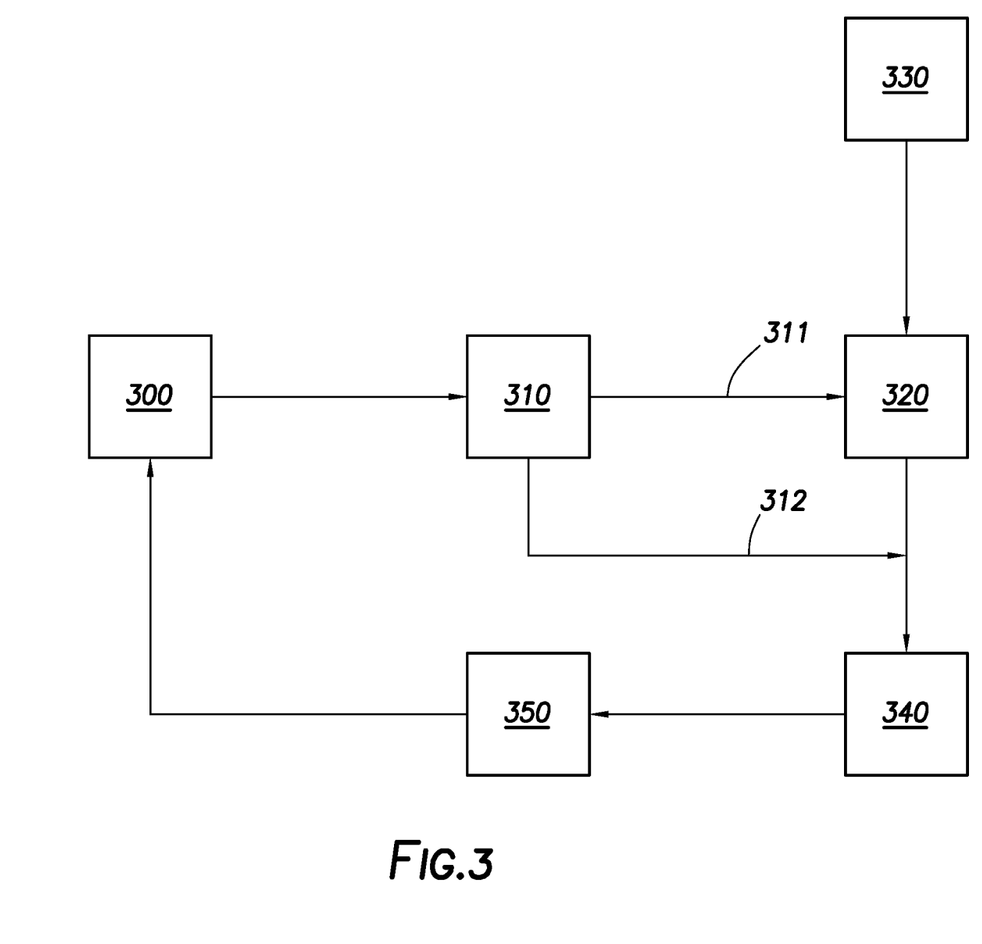
FIG. 3 is a schematic illustration of a system including a programmable smart fluid.

Reference is now made to FIG. 3. A system for using the programmable smart fluid in a drilling operation is illustrated in FIG. 3. A shaker 300 may accept a drilling fluid including a shape memory material from wellbore 350. Shaker 300 may separate solids such as drill cuttings from the drilling fluid. The shaker 300 may feed the solids separated from the drilling fluid into centrifuge 310 wherein the shape memory material present in the drilling fluid may be separated. The shaker 300 and the centrifuge 310 may form a separation unit for separation of the shape memory material from the drilling fluid. It should be understand the present technique is not limited to use of the shaker 300 and centrifuge 310 and other suitable equipment may be used for separation of the shape memory material. Shape memory material stream 311 may be conveyed into programming unit 320. The cleaned drilling fluid stream 312 may be combined with the effluent stream of programming unit 320. Programming unit 320 may deform the shape memory material as previously discussed as well as adding any base fluid necessary to convey the shape memory material. Programming unit 320 may include equipment for deforming the shape memory material to its programmed shape, including, without limitation, heated presses, electrical or magnetic field generators, and drying units, as well as coating the shape memory material coating such as vapor deposition systems, spraying booths, dipping tanks, and precipitation reactors. A real time fluid properties unit 330 may take in data about the fluid, wellbore, machinery, pumping schedule, mud engineer inputs, and other data streams in order to send instructions to the programming unit 320. Real time fluid properties unit 330 may include a processing unit (e.g., a microprocessor), input/output arrays, data storage, and network communication ports, among other equipment. The mud engineer may receive real time data about the fluid properties though the real time fluid properties unit 330 and may make any necessary adjustments. The effluent from programming unit 320 may be combined with cleaned drilling fluid stream 312 before being conveyed to mixing and pumping unit 340. Mixing and pumping unit 340 may prepare the drilling fluid by mixing additives such as bentonite and others previously discussed as well as any others known in the art. Mixing and pumping unit 340 may include tanks, reactors, pumps, blenders, valves, conveying means, tubulars, centrifuges, spraying devices, shearing devices, hydro-cyclones, shakers, compressors, weighing devices, mass flow devices, sensors such as rheometers, thermocouples, flow rate and density meters, computers and microprocessors and other oilfield equipment. The drilling fluid may be pumped into the wellbore 350 through a drillstring (not illustrated). The drilling fluid may exit wellbore 350 and be returned to shaker 300.

Figure 4:
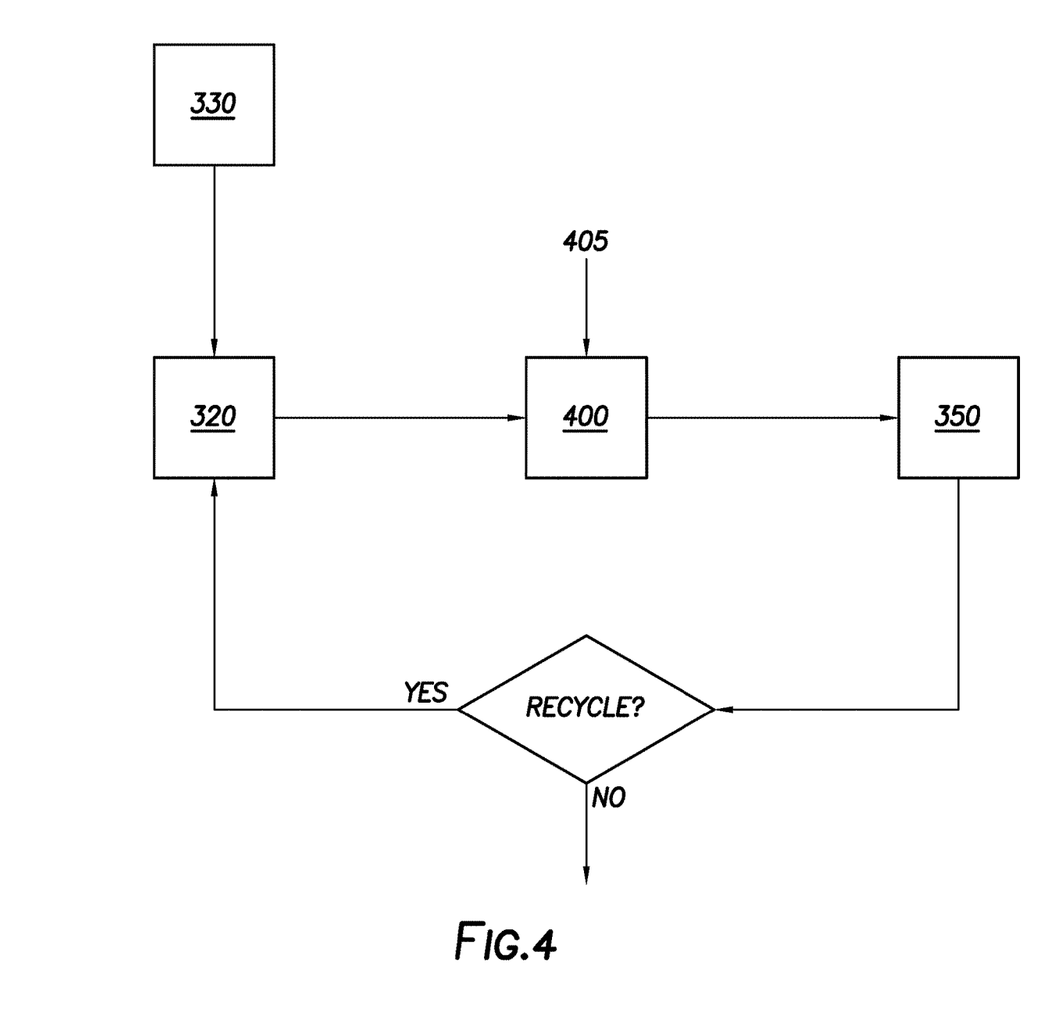
FIG. 4 is schematic illustration of an alternate system including a programmable smart fluid.

FIG. 4 illustrates another system that may be used using the programmable smart fluid in a wellbore service fluid. Real time fluid properties unit 330, programming unit 320, and wellbore 350 may be the same as in FIG. 3. Fluid pumping and conditioning unit 400 may accept an input stream designated by arrow 405 and the effluent from programming unit 320. The input stream may include any material that is pumped into the wellbore. Fluid pumping and conditioning unit 400 may include a plurality of pumps, mixers, valves, conveying means, tubulars, and other oilfield equipment. In some examples, fluid pumping and conditioning unit 400 may blend and create a wellbore service fluid such as those previously described. In some examples, fluid pumping and conditioning unit 400 may be configured to produce a hydraulic fracturing fluid. In such an example, fluid pumping and conditioning unit 400 may include a blender, proppant conveyance means, high pressure pumps, manifolds, water tanks, and tubulars. Programming unit 320 may provide a deformed shape memory material to be included in the fracturing fluid. Fluid pumping and conditioning unit 400 may combine the effluent deformed shape memory material with a proppant, base fluid, and additives from input stream 401 to create the fracturing fluid. Fluid pumping and conditioning unit 400 may pressurize the fracturing fluid to about 10,000 psi (68947.57 kPa) or more before conveying into wellbore 350. In general, wellbore 350 may include a wellhead, blowout preventer, and other surface equipment known in the art. In some examples, it may be desirable to recycle the wellbore servicing fluid after introduction into wellbore 350 as illustrated in FIG. 3 with a second circulating wellbore servicing fluid. In the example of the fracturing fluid, it may not be desirable to recycle as the fracturing fluid may not conform to one or more parameters such as for example, salinity. Another example where a recycle might be desirable is a lost circulation fluid. The lost circulation fluid including the shape memory material may be circulated as previously described to fill the lost circulation zone. In the case of a lost circulation fluid, a portion of the lost circulation fluid introduced into the wellbore may enter the lost circulation zone and the portion that does not enter the zone may return to the surface. The portion of fluid returning to the surface may be returned to the wellbore for further circulation.

In examples where the wellbore servicing fluid is recycled, the system may include any means for separating the shape memory material from the wellbore servicing fluid. In FIG. 2, the separation means was described as a shaker and centrifuge. It should be understood that other equipment configured to separate the components of the wellbore servicing fluid may be used as appropriate. Separation equipment may be configured to separate the components by any means, such as for example, adsorption, centrifugation, cyclonic separation, crystallization, decantation, distillation, drying, elutriation, evaporation, extraction, field flow fractionation, flotation, flocculation, filtration by mesh, bag, paper, microfiltration, ultrafiltration, nanofiltration, reverse osmosis, or membrane filtration, oil-water separation, magnetic separation, precipitation, recrystallization, scrubbing, sedimentation, gravity separation, sieving, stripping, and other methods known in the art. As discussed previously, there are many potential wellbore service fluids that a shape memory material may be added to. Fluid pumping and conditioning unit 400 may be configured in any way to enable the specific wellbore service fluid of interest to be produced and pumped. For example, fluid pumping and conditioning unit 400 may include a coil tubing truck and associated equipment if the wellbore servicing fluid is a cleanout fluid. As mentioned earlier, the wellbore serving fluid may include any number of servicing fluids including, but not limited to, smart lost circulation material fluids, smart barrier pills, smart sealing pills, smart high viscosity fluids, smart clean-up pills, and smart wellbore strengthening pills. Each wellbore servicing fluid may require different equipment in fluid pumping and conditioning unit 400 to be present. The specific shape memory materials chosen for any application may directly or indirectly affect the components and equipment of FIG. 4. For example, the drilling fluid 144 may directly or indirectly affect the fluid pumping and conditioning unit 400 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, sensors, gauges, pumps, compressors, and the like used store, monitor, regulate, and/or recondition the treatment fluids.

Accordingly, this disclosure describes systems, compositions, and methods relating to wellbore servicing fluids including shape memory materials. Without limitation, the systems, compositions and methods may further be characterized by one or more of the following statements:

Statement 1: A method comprising: providing a wellbore servicing fluid comprising: a base fluid; and a shape memory material; deforming the shape memory material to have a temporary shape; introducing the wellbore servicing fluid into a wellbore; and activating the shape memory material such that the shape memory material changes from the temporary shape to an initial shape.

Statement 2: The method of statement 1 wherein the shape memory material is selected from shape memory polymers, shape memory alloys and combinations thereof.

Statement 3: The method of statement 1 or statement 2 wherein the shape memory material is at least partially coated with an oil soluble coating, a water soluble coating or combinations thereof.

Statement 4: The method of any preceding statement wherein the activating comprises exposing the shape memory material to a stimuli selected from an electric field, a magnetic field, light, temperature, pressure, pH, salt ion concentration, and combinations thereof.

Statement 5: The method of any preceding statement wherein the shape memory material is incorporated in a fiber, wherein the fiber is deformed by rolling or folding, and wherein the activating the shape memory material comprises causing the fiber to unroll or unfold.

Statement 6: The method of any preceding statement further comprising returning at least a portion of the wellbore servicing fluid to a surface and separating at least a portion of the shape memory material from the base fluid to form a separated shape memory material.

Statement 7: The method of statement 6 further comprising deformed the separated shape memory material to form a deformed shape memory material and re-introducing the deformed shape memory material into the wellbore.

Statement 8: A wellbore servicing fluid comprising: a base fluid, wherein the base fluid comprises an oil based fluid or an aqueous based fluid; and a shape memory material, wherein the shape memory material is selected from shape memory polymers, shape memory alloys and combinations thereof, and wherein the shape memory material is configured to change shape in a wellbore when acted upon by one or more stimuli.

Statement 9: The wellbore servicing fluid of statement 8 wherein the shape memory material is 3-D printed.

Statement 10: The wellbore servicing fluid of statement 8 or statement 9 wherein the wellbore servicing fluid comprises the base fluid in an amount ranging from about 10 wt. % to about 99 wt. % based on the total weight of the wellbore servicing fluid.

Statement 11: The wellbore servicing fluid of any one of statements 8 to 10 wherein the one or more stimuli are selected from an electric field, a magnetic field, light, temperature, pressure, pH, salt ion concentration, or combinations thereof.

Statement 12: The wellbore servicing fluid of any one of statements 8 to 11 wherein the wellbore servicing fluid comprises the shape memory material in an amount ranging from about 0.1 wt. % to about 30 wt. % of the wellbore servicing fluid.

Statement 13: The wellbore servicing fluid of any one of statements 8 to 12 wherein the shape memory material is at least partially coated with an oil soluble coating, a water soluble coating or combinations thereof.

Statement 14: The wellbore servicing fluid of any one of statements 8 to 13, wherein the shape memory material is incorporated into a fiber, wherein the fiber is rolled or folded in a temporary shape.

Statement 15: The wellbore servicing fluid of statement 14, wherein the fiber comprises a glass material and the shape memory material.

Statement 16: A system for servicing a wellbore comprising: a wellbore servicing fluid comprising a shape memory material; a programming unit configured to deform the shape memory material; a mixing and pumping unit fluidly coupled to the wellbore; and a separation unit fluidly coupled to the wellbore configured to separate at least a portion of the shape memory material from the base fluid.

Statement 17: The system of statement 16, wherein the shape memory material is selected from shape memory polymers, shape memory alloys and combinations thereof.

Statement 18: The system of statement 16 or statement 17, wherein the shape memory material is at least partially coated with an oil soluble coating or a water soluble coating.

Statement 19: The system of any one of statements 16 to 18, wherein the wellbore servicing fluid comprises a lost circulation fluid or a drilling fluid.

Statement 20: The system of any one of statements 16 to 19, wherein the programming unit comprises at least one member selected from the group consisting of a heated press, an electrical field generator, a magnetic field generator, and a drying unit.

The disclosed shape memory materials may directly or indirectly affect any pumping systems, which representatively includes any conduits, pipelines, trucks, tubulars, and/or pipes which may be coupled to the pump and/or any pumping systems and may be used to fluidically convey the drilling fluid downhole, any pumps, compressors, or motors (e.g., topside or downhole) used to drive the drilling fluid into motion, any valves or related joints used to regulate the pressure or flow rate of the drilling fluid, and any sensors (i.e., pressure, temperature, flow rate, etc.), gauges, and/or combinations thereof, and the like. The shape memory materials may also directly or indirectly affect any mixing hoppers and retention pits and their assorted variations.

The disclosed shape memory materials may also directly or indirectly affect the various downhole equipment and tools that may come into contact with the wellbore servicing fluids such as, but not limited to, the drill string, any floats, drill collars, mud motors, downhole motors and/or pumps associated with the drill string, and any MWD/LWD tools and related telemetry equipment, sensors or distributed sensors associated with the drill string. The disclosed shape memory materials may also directly or indirectly affect any downhole heat exchangers, valves and corresponding actuation devices, tool seals, packers and other wellbore isolation devices or components, and the like associated with the wellbore. The shape memory materials may also directly or indirectly affect the drill bit, which may include, but is not limited to, roller cone bits, PDC bits, natural diamond bits, any hole openers, reamers, coring bits, etc.

While not specifically illustrated herein, a drilling fluids including a shape memory material may also directly or indirectly affect any transport or delivery equipment used to convey the drilling fluids to the drilling assembly such as, for example, any transport vessels, conduits, pipelines, trucks, tubulars, and/or pipes used to fluidically move the drilling fluids from one location to another, any pumps, compressors, or motors used to drive the drilling fluids into motion, any valves or related joints used to regulate the pressure or flow rate of the drilling fluids, and any sensors (i.e., pressure and temperature), gauges, and/or combinations thereof, and the like.

The exemplary shape memory materials disclosed herein may directly or indirectly affect one or more components or pieces of equipment associated with the preparation, delivery, recapture, recycling, reuse, and/or disposal of the shape memory materials. For example, the wellbore servicing fluids including a shape memory material may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the sealant composition. The shape memory materials may also directly or indirectly affect any transport or delivery equipment used to convey the wellbore servicing fluids to a well site or downhole such as, for example, any transport vessels, conduits, pipelines, trucks, tubulars, and/or pipes used to compositionally move the wellbore servicing fluids from one location to another, any pumps, compressors, or motors (e.g., topside or downhole) used to drive the hydrogel particles into motion, any valves or related joints used to regulate the pressure or flow rate of the hydrogel particles (or fluids containing the same hydrogel particles, and any sensors (i.e., pressure and temperature), gauges, and/or combinations thereof, and the like. The disclosed shape memory materials may also directly or indirectly affect the various downhole equipment and tools that may come into contact with the shape memory materials such as, but not limited to, wellbore casing, wellbore liner, completion string, insert strings, drill string, coiled tubing, slickline, e-line, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

We claim:

1. A method comprising:
   providing a wellbore servicing fluid comprising:
   a base fluid; and
   a shape memory material, wherein the shape memory material is incorporated in a fiber, wherein the fiber is deformed by rolling or folding, and wherein the activating the shape memory material comprises causing the fiber to unroll or unfold;
   deforming the shape memory material to have a temporary shape;
   introducing the wellbore servicing fluid into a wellbore; and
   activating the shape memory material such that the shape memory material changes from the temporary shape to an initial shape.

2. The method of claim 1 wherein the shape memory material is selected from shape memory polymers, shape memory alloys and combinations thereof.

3. The method of claim 1 wherein the shape memory material is at least partially coated with an oil soluble coating, a water soluble coating or combinations thereof.

4. The method of claim 1 wherein the activating comprises exposing the shape memory material to a stimulus selected from an electric field, a magnetic field, light, temperature, pressure, pH, salt ion concentration, and combinations thereof.

5. The method of claim 1 further comprising returning at least a portion of the wellbore servicing fluid to a surface and separating at least a portion of the shape memory material from the base fluid to form a separated shape memory material.

6. The method of claim 5 further comprising deformed the separated shape memory material to form a deformed shape memory material and re-introducing the deformed shape memory material into the wellbore.

7. A wellbore servicing fluid comprising:
   a base fluid, wherein the base fluid comprises an oil based fluid or an aqueous based fluid; and
   a shape memory material, wherein the shape memory material is selected from shape memory polymers, shape memory alloys and combinations thereof, and wherein the shape memory material is configured to change shape in a wellbore when acted upon by one or more stimuli, wherein the shape memory material is incorporated into a fiber, wherein the fiber is rolled or folded in a temporary shape.

8. The wellbore servicing fluid of claim 7 wherein the shape memory material is 3-D printed.

9. The wellbore servicing fluid of claim 7 wherein the wellbore servicing fluid comprises the base fluid in an amount ranging from about 10 wt. % to about 99 wt. % based on the total weight of the wellbore servicing fluid.

10. The wellbore servicing fluid of claim 7 wherein the one or more stimuli are selected from an electric field, a magnetic field, light, temperature, pressure, pH, salt ion concentration, and combinations thereof.

11. The wellbore servicing fluid of claim 7 wherein the wellbore servicing fluid comprises the shape memory material in an amount ranging from about 0.1 wt. % to about 30 wt. % of the wellbore servicing fluid.

12. The wellbore servicing fluid of claim 7 wherein the shape memory material is at least partially coated with an oil soluble coating, a water soluble coating or combinations thereof.

13. The wellbore servicing fluid of claim 7, wherein the fiber comprises a glass material and the shape memory material.

14. A system for servicing a wellbore comprising:
   a wellbore servicing fluid comprising a shape memory material, wherein the shape memory material is at least partially coated with an oil soluble coating or a water soluble coating;
   a programming unit configured to deform the shape memory material;
   a mixing and pumping unit fluidly coupled to the wellbore; and
   a separation unit fluidly coupled to the wellbore configured to separate at least a portion of the shape memory material from the servicing fluid.

15. The system of claim 14, wherein the shape memory material is selected from shape memory polymers, shape memory alloys and combinations thereof.

16. The system of claim 14, wherein the wellbore servicing fluid comprises a lost circulation fluid or a drilling fluid.

17. The system of claim 14, wherein the programming unit comprises at least one member selected from the group consisting of a heated press, an electrical field generator, a magnetic field generator, and a drying unit.

* * * * *